April 1, 1941.  R. F. WILSON ET AL  2,237,245

INNER TUBE

Filed March 12, 1937

INVENTORS
ROBERT F. WILSON
WILLARD L. KLINGMAN
BY Albert L. Ely
ATTORNEY

Patented Apr. 1, 1941

2,237,245

UNITED STATES PATENT OFFICE 2,237,245

INNER TUBE

Robert F. Wilson and Willard L. Klingman, Akron, Ohio, assignors to The Firestone Tire & Rubber Company, Akron, Ohio, a corporation of Ohio Application March 12, 1937, Serial No. 130,528

4 Claims. (Cl. 152—342)

This invention relates to inner tubes such as are used in pneumatic tire casings, and more especially it relates to inner tubes that are designed to close or seal a puncture or blow-out in the tire casing, and to prevent the escape of more than a minor portion of the air therefrom.

The chief objects of the invention are to provide an improved inner tube of the character mentioned; to provide safety and convenience in the operation of motor vehicles; and to provide an inner tube comprising a puncture-sealing element that normally is out of engagement with the tire casing and hence not subject to the flexing of the latter, whereby heating and consequent deterioration of the said sealing element is avoided. Other objects will be manifest as the specification proceeds.

Figure 1:
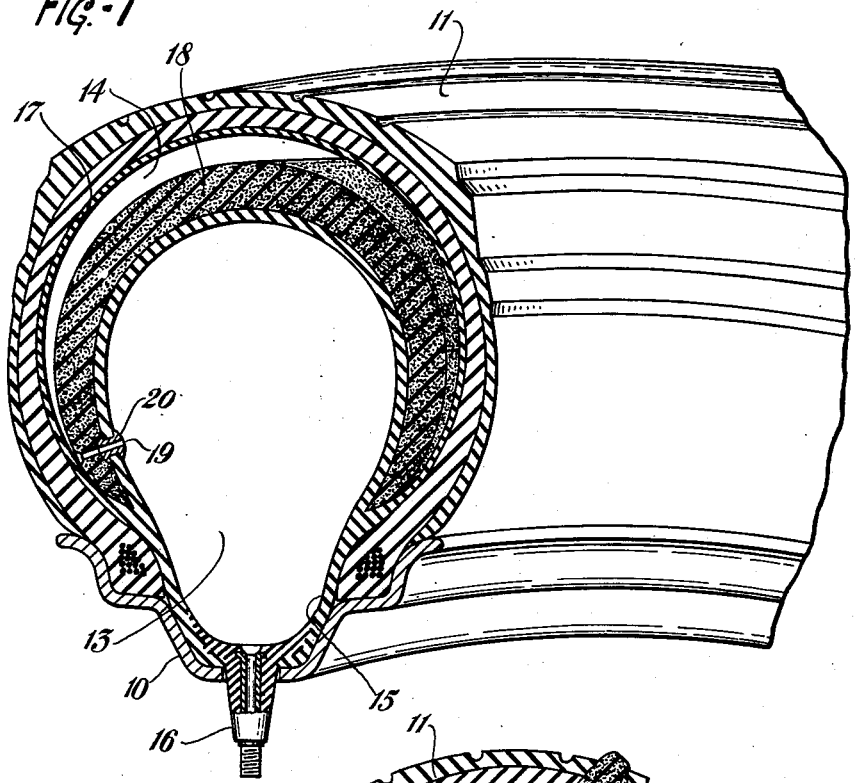
Figure 2:
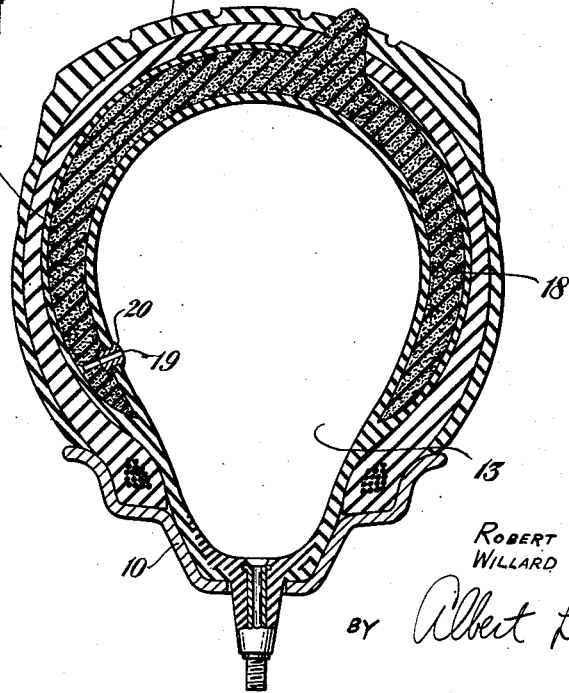

Of the accompanying drawing:

Figure 1 is a fragmentary sectional perspective view of a tire casing, and the improved inner tube therein in fully inflated condition; and Figure 2 is a transverse sectional view of the structure shown in Figure 1 showing the condition of the tire and tube after a blow-out has occurred.

Referring to the drawing, 10 is an annular metal tire rim of the drop-center type, and 11 is a tire casing of usual construction thereon, the tread portion of the tire being shown relatively thin as in the case of well worn tires. The improved inner tube is mounted interiorly of the tire casing.

Said inner tube consists of two concentric compartments 13, 14 of which the latter compartment is disposed about the outer periphery of the inner compartment 13 and is considerably smaller than the latter. The inner compartment is formed within an annular elastic tube 15 that is of smaller transverse area than tubes normally provided for the particular tire, said tube being provided on its inner periphery with the usual valve stem 16 for inflation purposes. The outer compartment 14 is formed by an annular elastic rubber wall 17 that is mounted upon the outer periphery of the tube 15 and has its respective lateral margins united to the sidewalls of said tube in the region of the bead portions of the tire 11. Interiorly of the compartment 14 is a layer of soft cellular sponge rubber 18 that is adhesively secured to the outer face of the tube 15 and extends transversely thereof from the juncture of wall 17 on one side of the tube to a similar point on the opposite side of the tube. The thickness of the sponge rubber layer 18 is substantial, but is not enough to fill the chamber 14 completely. Chamber 13 and chamber 14 are interconnected by a small passage 19 that extends through the wall of tube 15 and through sponge layer 18, near one margin of the latter, the tube 15 being reinforced about the inner end of said passage by means of a stiff rubber grommet 20 that is vulcanized in place.

The arrangement is such that when the improved inner tube is mounted in a tire 11 and inflated, some of the air entering compartment 13 will pass therefrom through passage 19 and enter compartment 14, with the result that the pressure in the two compartments is equalized, and sponge rubber layer 18 will be disposed in spaced relation to the wall 17, the latter being in engagement with the inner surface of the tire as is most clearly shown in Figure 1. Thus the flexing of the tire incidental to its use is not transmitted to the sponge layer 18, nor is there any friction between said sponge layer and the tube wall 17. The arrangement prevents heating of the layer 18 and results in longer life of the latter.

The action of the improved inner tube in the event of a blow-out is shown in Figure 2. The rupture of the wall 17, from puncture or blow-out of the tire casing 11, results in the immediate deflation of tube chamber 14, thus creating a pressure differential in chambers 14 and 13 that causes the latter to expand and thus to distend the sponge layer 18 throughout its entire area so that a portion thereof is forced into the opening in the tire casing to close and seal the same. Thereafter there is little or no loss of air from the tube since the pressure of the layer 18 against wall 17 also effects the closing of the delivery end of passage 19, the latter being positioned at a point that is relatively remote from the regions of the tire where punctures and blow-outs usually occur. Experience has shown that in inner tubes of the character described initially inflated to 35 pounds pressure, there is a residual pressure of about 20 pounds after the outer chamber 14 has been deflated. This pressure is sufficient to prevent rim-cutting of the tire, and to prevent accidents such as frequently occur when blow-outs take place while the vehicle is moving at high speed.

Modification may be resorted to without departing from the spirit of the invention or the scope of the appended claims.

What is claimed is:

1. An inner tube for pneumatic tires, said inner tube comprising two annular, concentric, inflatable compartments, of which one compartment is disposed radially outwardly of the other, a layer of cellular sponge rubber in the outermost compartment adhered to the inner wall of the latter and normally spaced from the outer wall thereof, and means for utilizing the differential pressure existing in said compartments when the outer compartment is deflated to expand the inner compartment and thereby to force the sponge rubber layer against said outer wall.

2. An inner tube of the character described comprising two annular, concentric compartments of which one compartment is disposed about the outer periphery of the other, a layer of soft cellular rubber in the outermost compartment extending from one side thereof to the other and adhered to the inner wall thereof in spaced relation to the outer wall, means for admitting air to the innermost of said compartments, and an air passage extending from said inner compartment to said outer compartment, said passage extending through the intervening tubewall and cellular rubber layer, and being of relatively small size and so positioned that upon deflation of the outermost compartment said passage will be sealed by contact of the cellular rubber with the wall of the outer compartment as the result of expansion of the inner compartment due to differential pressure, before there is any substantial loss of air from said inner compartment.

3. A combination as defined in claim 2 in which the air passage is disposed relatively near one lateral margin of the cellular rubber layer.

4. A fluid pressure retaining device for pneumatic tires, said device comprising two annular, concentric, inflatable compartments, of which one compartment extends radially outwardly of the other, a distensible wall separating the two chambers and normally spaced from the inside of the wall of said device, means carried by said distensible wall adapted to be forced against the inside of a pneumatic tire casing to close a rupture therein, as in the case of a blow-out, a small passage between said compartments so that both compartments may be inflated as a unit, but whereby upon sudden release of pressure in the outer chamber, as in the case of a blowout, said separating wall will distend into contact with the inside wall of said device.

ROBERT F. WILSON.
WILLARD L. KLINGMAN.